Sept. 13, 1960 F. G. REUTER ET AL 2,952,486
ELASTIC COUPLING FOR JOINTED MEMBERS
Filed Nov. 21, 1958

INVENTORS
FRANZ GOTTFRIED REUTER
GEORG KINDEL
JÜRGEN ULDERUP
BY

ATTORNEYS

United States Patent Office 2,952,486
Patented Sept. 13, 1960

2,952,486

ELASTIC COUPLING FOR JOINTED MEMBERS

Franz Gottfried Reuter, Georg Sigfried Kindel, and Jürgen Ulderup, all of Lemforde, Hannover, Germany, assignors, by mesne assignments, to Mobay Chemical Company, Pittsburgh, Pa., a corporation of Delaware Filed Nov. 21, 1958, Ser. No. 775,535

Claims priority, application Germany Nov. 27, 1957

4 Claims. (Cl. 287—85)

This invention relates generally to flexible joints and, more particularly, to an improved flexible joint between the tie rod and the lever arm of a vehicle steering mechanism.

The coupling between the tie rod or tie bar and the lever arm of a steering mechanism of heavy vehicles must be of such a construction that angular deflection is possible in order that stiffness in the steering gear will be avoided. It is also necessary that these joints be of such a construction that they will not wear excessively and play or looseness will not develop between the parts as the steering mechanism is used. It has been the custom heretofore to manufacture the joint between the tie bar and lever arm with ball joints which provide angular deflection in all directions. This type of joint has not been entirely satisfactory, however, because the construction of such a joint is expensive and often the mechanism must be repaired or replaced. It has also been proposed to provide lubricated couplings having elastic elements therein. These elastic elements have heretofore been provided with interior inserts, such as a fabric impregnated with a lubricant which is noninjurious to rubber, such as graphite; however, these known composite elements are expensive to manufacture and have but a limited service life.

It is, therefore, an object of this invention to provide a simple, economical, yet reliable, flexible joint between the tie bar and lever arm of a steering mechanism. Another object of the invention is to provide an improved flexible joint between the tie bar and lever arm of a steering mechanism which is resistant to wear and provides the optimum angular deflection in any direction. Still another object of the invention is to provide an elastic coupling between a tie bar and a pin-hinged lever arm in the steering mechanism of heavy vehicles which provides the necessary amount of angular deflection and is adapted to withstand wear during the life of the coupling without maintenance. A further object of the invention is to provide an oil, grease, and abrasion-resistant elastic coupling between a tie bar and a pin-hinged lever arm in the steering mechanism of heavy vehicles. Still another object of the invention is to provide means for lubricating the elastic coupling.

Other objects will become apparent from the following description with reference to the accompanying drawings in which.

Figure 1:
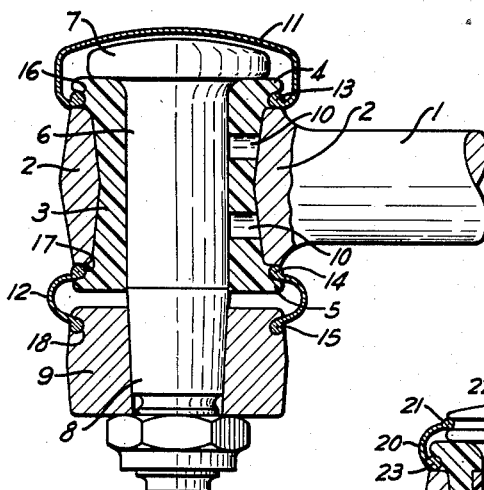
Figure 1 illustrates one embodiment of the invention.

In accordance with the elastic coupling described in application Serial Number 644,670, filed March 7, 1957, now abandoned, of which this application is a continuation-in-part, the foregoing objects are accomplished by providing a flexible joint having an elastic bushing between the tie bar and pin or bolt connecting the tie bar to the lever arm of the steering mechanism. The bushing provided is made of a polyurethane plastic containing a silicone oil, molybdenum disulfide, and, usually, a hydrocarbon. Such a bushing provides a sturdy elastic coupling which permits angular deflection of the tie bar and provides a rigid steering mechanism.

In accordance with the elastic coupling described in application Serial Number 750,755, filed July 14, 1958, of which this application is also a continuation-in-part, the foregoing objects as well as others are accomplished by providing means for lubricating, with conventional lubricants, a flexible joint having a shaped polyurethane plastic bushing between the tie bar and pin or bolt connecting the tie bar to the lever arm of the steering mechanism. It was found that the addition of lubricating means permitted an improved angular deflection of the tie bar when the polyurethane bushing contains such additives as silicone oil, molybdenum disulfide, and a hydrocarbon, and that a substantially equal angular deflection is permitted even though the polyurethane plastic bushing does not contain the additives mentioned.

Generally speaking, in accordance with the instant invention, it has now been found that the foregoing objects as well as others are achieved by providing permanent lubricating means for the elastic coupling by providing enclosed areas at each end of the plastic bushing to effectively retain a lubricant through the life of the coupling. The enclosed areas are formed by resilient cover members which also serve to effectively seal off the atmosphere and prevent ingress of foreign matter in between the bearing surfaces of the elastic bushing and the pin. The resilient cover members are provided with ring bulges which frictionally engage appropriate ring grooves provided in either the elastic bushing or the other members of the elastic coupling, thereby forming a positive seal. The low frictional characteristics of the elastic bushing in accordance with the invention is further improved in one preferred embodiment by providing as a lining for the bearing surface of the elastic bushing a tetrafluor polyethylene plastic. The tetrafluor polyethylene exhibits excellent anti-friction characteristics and is also highly resistant to chemical corrosion and, further, is resistant to heat deformation at elevated temperatures.

The elastic bushing provided by the invention is preferably made of a flexible polyurethane elastomer which is particularly abrasion resistant, to aging, and resistant to materials, such as, gasoline and lubricants and in a preferred embodiment has its interior lined with a tetrafluor polyethylene plastic or, in still another embodiment, may be provided with a plurality of radially disposed holes which act as grease chambers.

The bore at the end of the tie rod is provided with a double tapered inner wall with the minimum diameter at the center thereof which, in combination with the polyurethane plastic bushing, provides the maximum amount of angular deflection in any direction and, at the same time, provides a coupling having the required amount of rigidity necessary in steering mechanisms. Actually, in a preferred embodiment, the bore of the tie rod is cylindrical at the center of the thickness of the tie rod and this cylindrical surface extends on each side of the center line for a short distance. The bore then flares outwardly to form the double tapered bore.

The cover member as provided by the invention may be made from any flexible, resilient, and corrosion resistant material, such as, spring steel and the like, or may be made from a flexible resilient polyurethane plastic.

The polyurethane plastic used for making the elastic bushing may be prepared by reacting any suitable compound having reactive hydrogen atoms with a polyisocyanate and a cross-linking agent. Suitable compounds having reactive hydrogen atoms are, for example, polyesters, polyester amides, polyalkylene ether glycols, and polythioether glycols. Preferably, one of these compounds or a mixture thereof is reacted with an excess of a suitable diisocyanate and the reaction product is then reacted with a bifunctional compound which will bring about cross-linking such as, for example, a glycol, a diamine, or amino alcohol or water. Suitable elastic rubber-like polyurethane plastics may be made in accordance with the process disclosed in United States Patents 2,620,516; 2,621,166; 2,729,618; 2,755,266; 2,764,565; and 2,778,810.

In order to impart the necessary properties to the bushing, in one preferred embodiment, the polyurethane plastic is mixed with a silicone oil and molybdenum disulfide. Best results are obtained if a hydrocarbon is also incorporated in the polyurethane bushing. The molybdenum disulfide, hydrocarbon, and silicone oil may be introduced into the polyurethane plastic at any stage during the reaction between the polyhydroxy compound and the polyisocyanate, but it is preferred to mix these additives with the reaction mixture before reaction between the polyhydroxy compound and the polyisocyanate. A convenient method of incorporating the additives into the polyurethane plastic is to first mix them with the polyhydroxy compound and to then combine this mixture with the polyisocyanate. After the reaction between the polyhydroxy compound and the polyisocyanate, cross-linking is brought about by adding a cross-linker or chain-extender, such as, water, a glycol, or a diamine, and heating the mixture.

Any suitable hydrocarbon may be utilized, such as, for example, high-boiling petroleum fractions, including kerosene and conventional lubricating oils and waxes, including paraffin, beeswax, ceresin, and the like.

The molybdenum disulfide should preferably be of a high technical grade and of high purity and if it approaches chemically pure molybdenum disulfide, it may be advantageously incorporated into the reaction mixture after the polyisocyanate has been mixed with the organic compound having the terminal hydroxyl groups. Methods for preparing substantially pure molybdenum disulfide are disclosed in United Stated Patents 2,367,946 and 2,686,156. The products of the methods disclosed in these patents are particularly well suited for use in this invention.

From about 0.01% to about 5% by weight, and, preferably, from about 0.5% to about 1% by weight, based on the weight of the cured rubber-like polyurethane plastic, moylbdenum disulfide is used in accordance with this invention in preparing the plastic bearing surface. Any suitable solid form of molybdenum disulfide may be used, but it is preferred to use a molybdenum disulfide powder having a particle size within the range of from about 0.002 mm. to about 2 mm. in cross-sectional dimensions and, preferably, from about 0.002 mm. to about 0.02 mm., in order to obtain maximum abrasion resistance.

The combined amount of silicone oil and hydrocarbon used in preparing the bearing surface is preferably from about 0.01% to about 5% by weight, based on the weight of the cured rubber-like polyurethane plastic, but, in some instances, even greater amounts may be used if desired.

Any suitable liquid organo-polysiloxane may be used as the silicone oil provided the viscosity thereof is from about 50 to about 500 centistokes at 20° C. Examples of suitable silicone oils include dimethylsiloxane polymers having a viscosity of about 50 centistokes at 20° C., dimethylsiloxane polymers having a viscosity of about 140 centistokes at 20° C., and dimethylsiloxane polymers having a viscosity of about 440 centistokes at 20° C., and mixtures thereof.

Any suitable compound having reactive hydrogen atoms may be used in accordance with the invention. Preferably, the compounds should have a molecular weight of at least about 1,000. Any suitable linear hydroxyl polyester may be used including those disclosed in United States Patents 2,620,516 and 2,729,618. For example, polyesters formed by conventional thermal esterification methods of dihydric alcohols and dibasic organic acids may be used as the organic compound having the terminal hydroxy groups. The alcohol component should be used in such amount as to produce the final product having an hydroxyl number within the range of from about 20 to about 80. Examples of suitable dicarboxylic acids include adipic acid, succinic acid, and the like. The dihydric alcohol may be ethylene glycol or other suitable glycols. A convenient method for carrying out the thermal esterification involves heating the reactants to a temperature of from about 110° C. to about 120° C. until water formed during the esterification is removed by distillation and then raising the temperature to from about 210° C. to about 220° C. under reduced pressure until esterification is completed. The resulting polyester having terminal hydroxyl groups is then dehydrated by maintaining it at a temperature of from about 110° C. to about 150° C. under a pressure less than atmospheric or while covered with an inert gas, such as, nitrogen, until all of the moisture has been removed. If a polyesteramide is to be produced, a certain amount of an amine or an amino alcohol is mixed with the other starting materials used in making the polyester. Suitable polythioethers may be prepared by thermal condensation of a thioether glycol with a polyhydric alcohol in a molar ratio of from about 1:1 to about 1:1.5. The reaction mixture is heated in the presence of a dehydration catalyst to a temperature of from about 150° C. to about 250° C. to remove the water formed during esterification or etherification by distillation. Any suitable polyalkylene ether glycol may be used in accordance with the invention. Suitable polyalkylene ether glycols may be prepared by condensing alkylene oxides having from 2 to 5 carbon atoms, such as, ethylene oxide, propylene oxide, butylene oxide, and amylene oxide. Moreover, branched condensation products of the polyalkylene ether glycols or the alkylene oxides above mentioned with any suitable polyhydric alcohol, such as, glycerine, trimethanol propane, pentaerythritol, and the like may be used.

Any suitable diisocyanate may be used to react with the linear hydroxyl polyester, polyalkylene ether glycol or polyalkylene thioether glycol, including 2,4-tolylene diisocyanate, 2,6-tolylene diisocyanate, p-phenylene diisocyanate, 4,4'-diphenylmethane diisocyanate, 1,5-naphthalene diisocyanate, dibenzidene diisocyanate, and benzidene diisocyanate. From about 20 percent to about 250 percent excess diisocyanate over that required to react with all of the reactive hydrogen atoms of the polyester or other organic compound having reactive hydrogen atoms should be used and the reaction is preferably carried out at temperatures of from about 80° C. to about 180° C. The isocyanate-modified polyester is subjected to a cross-linking reaction with a glycol, diamine, amino alcohol, or other suitable bifunctional compound of a molecular weight of less than about 1,000 to obtain a cured rubber-like polyurethane plastic. Any suitable glycol, such as, for example, 1,2-propylene glycol, 1,3-butylene glycol, 1,4-butylene glycol, quinite, or the like, may be utilized. Examples of suitable amino alcohols include amino propanol, beta-amino propanol, and gamma-amino alcohol. The mixture of isocyanate-modified polyester or isocyanate-modified condensation product of a polythioether glycol or polyalkylene ether glycol with the polyhydric alcohol is heated from a temperature of about 60° C. to about 180° C. until the cross-linking reaction has been completed. It is preferred to dissolve a small amount of acid, such as, dry hydrogen chloride, or an acid-producing compound, such as, for example, acid chlorides, like acetyl chloride or thionyl chloride, in the cross-linking agent to slow down the cross-linking reaction which is accelerated by the presence of molybdenum disulfide. Usually, from about 0.001% to about 1% acid, and, preferably, from about 0.002% to about 0.1% by weight, based on the weight of the cross-linking agent, is used.

As already pointed out, the required amount of molybdenum disulfide, silicone oil, and hydrocarbon is preferably added to the polyester or other polyhydroxy compound but, if desired, in some instances, it may be added to the isocyanate-modified polyhydroxyl compound or to the cross-linking agent.

It has been found that bearing surfaces of rubber-like polyurethane plastics having the molybdenum disulfide and silicone oil display an extraordinarily low coefficient of friction. For example, the coefficient of friction between the rubber-like polyurethanes and steel is about 0.1.

Referring now to the drawings, Figure 1 illustrates a tie bar 1 terminating in a housing 2 having a pin 6 inserted therein. Lying between the pin 6 and the housing 2 is an elastic bushing 3 of a polyurethane plastic containing about 1% by weight of molybdenum disulfide and about 1% silicone oil. The polyurethane plastic is prepared from about 1,000 parts by weight of a linear polyester obtained by thermal esterification of adipic acid with ethylene glycol and having a molecular weight of about 2,000, an hydroxyl number of about 50, and an acid number of about 1 heated at about 135° C. at less than atmospheric pressure and preferably at a pressure approaching a vacuum for about one hour until substantially all the moisture has been removed. About 3 parts molybdenum disulfide powder having a particle size of about 0.01 mm. in diameter, about 3 parts of a dimethylsiloxane polymer having a viscosity of about 140 centistokes at about 20° C., and about 2 parts paraffin wax are then added to the polyester. About 300 parts by weight naphthalene-1,5-diisocyanate are next introduced into the mixture and reaction is brought about by allowing the mixture to set for about 10 minutes while the pressure in the reaction vessel is less than atmospheric. About 70 parts 1,4-butanediol containing about 1% dry hydrogen chloride are added within about 1 minute while stirring the mixture vigorously. The resulting mixture is poured into a suitable mold and maintained at about 110° C. for about 24 hours or until the polyurethane plastic has cured into a rubber-like polyurethane plastic of the desired size and shape for the elastic bushing 3.

The polyurethane bushing is provided with collars 4 and 5 at each end thereof which tightly grip the housing 2. The pin head 7 rests upon the upper face of the plastic bushing 3. One end of the pin 6 is provided with a tapered portion 8 onto which is bolted a steering arm end 9. The plastic bushing 3 is provided with a plurality of grease chambers 10 which assures continuous lubrication of the bearing surface. All areas of relative motion between parts of the elastic coupling are sealed by cover members 11 and 12, respectively. The flexible cover members 11 and 12 are provided with ring bulges 13, 14, and 15 which frictionally engage into appropriate ring grooves 16 and 17 in the plastic bushing 3 and 18 in the steering arm end 9, thereby forming a positive seal. The cover member 11 completely encloses the pin head 7 and the ring bulge 13 frictionally engages an upper ring groove 16 in the plastic bushing 3. The cover member 12 encloses the coupling in the area between the plastic bushing 3 and the steering arm end 9 and the upper ring bulge 14 frictionally engages the ring groove 17 in the plastic bushing 3 while the lower ring bulge 15 frictionally engages the ring groove 18 on the steering arm end 9.

It is of special advantage to provide the ring grooves on the plastic bushing since the ring grooves may be easily and economically provided during the one step casting operation in the manufacture of the bushing while, on the other hand, the special machining operation is required for the metallic members of the elastic coupling.

Figure 2:
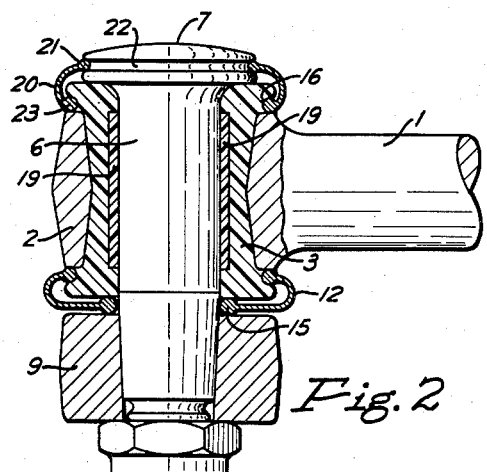
Figure 2 illustrates still another embodiment of the invention.
Figure 3:
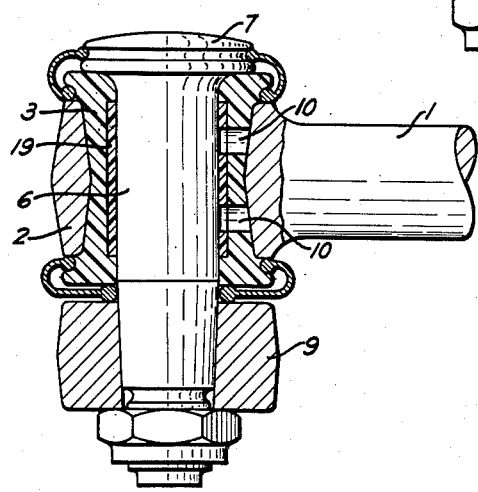
Figure 3 illustrates a further embodiment of the invention.

In Figure 2 the plastic bushing 3 is provided with a tetrafluor polyethylene lining 19. Preferably, the tetrafluor polyethylene plastic lining does not extend over the entire length of the bearing surface of the plastic bushing 3, but rather only over the major central portion thereof. A cover member 20 is provided to enclose the upper portion of the plastic bushing 3 and the pin head 7. The cover member 20 is provided with a ring bulge 21 which frictionally engages a ring groove 22 in the pin head 7 and with a ring bulge 23 which frictionally engages the ring groove 16 in the plastic bushing. The lower cover member 12 as illustrated in Figure 2 is a slight modification of the cover member 12 as shown in Figure 1. The bulge 15 of the cover member 12 is frictionally held in place by the plastic bushing 3 and the steering arm end 9 in an area adjacent the tapered portion 8 of the pin 6. Figure 3 illustrates still another embodiment of the invention in which the elastic bushing 3 is provided with an interior lining of a tetrafluor polyethylene plastic as well as grease chambers 10.

It is to be understood that any combination of the various elements as shown in the drawings may be used in accordance with the invention, for instance, in Figure 2 the cover member 11 of Figure 1 may be used instead of the cover member 20. Likewise, any other modification which obviously falls within the skill of one familiar with the art is intended to be covered. It is also to be understood that the voids created between the cover members and the various other members of the elastic coupling may be preferably provided with additional amounts of lubricants in order to provide additional lubrication and also prevent ingress of foreign matter and the like.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

Tetrafluor polyethylene is obtained by polymerizing tetrafluor ethylene into long linear chains of molecular weights of from about 30,000 to about 100,000. One suitable commercially available tetrafluor polyethylene is known to the trade by the name of Teflon.

What is claimed is:

1. In an elastic coupling between a tie rod and a lever arm, said tie rod terminating in a housing, a pin positioned in said housing and connected to said lever arm, and between said pin and housing an elastic polyurethane bushing having radially disposed chambers adapted to retain lubricants and an interior lining of tetrafluor polyethylene and resilient sealing cover members enclosing said bushing.

2. In an elastic coupling between a tie rod and a lever arm, said tie rod terminating in a housing, a pin positioned in said housing and connected to said lever arm, and between said pin and housing an elastic polyurethane bushing having radially disposed chamber therein, adapted to retain lubricants and resilient sealing cover members enclosing said bushing.

3. An elastic joint comprising, in combination, a tie rod and a lever arm, said tie rod terminating in a housing, a pin positioned in said housing and connected to said lever arm, and between said pin and housing an elastic polyurethane bushing having radially disposed chambers therein adapted to retain a lubricant, said bushing having an interior lining of tetrafluor polyethylene and resilient sealing means connected to and enclosing said bushing with at least two flexible cover members to effectively prevent ingress of foreign matter.

4. In an elastic coupling between a tie rod and a lever arm, said tie rod terminating in a housing, said housing having a bore therethrough, a pin positioned within said bore and connected to said lever arm, the improvement which comprises said bore having a double-tapered inner wall with a minimum diameter at the center thereof, a resilient bushing disposed within said bore between said pin and said housing and having collar means at the ends thereof for tightly gripping said housing, said bushing including a plurality of radially extending chambers for continually lubricating said joint, said bushing having a bearing surface adjacent said pin, said surface being polytetrafluoroethylene, said collar means including circumferential grooves therein, and means operable in conjunction with said circumferential grooves for sealing said joint from foreign substances, said means comprising resilient cover members having enlarged portions for frictionally engaging said circumferential grooves.

References Cited in the file of this patent

UNITED STATES PATENTS

| | | |
|---|---|---|
| 1,971,676 | Borst | Aug. 28, 1934 |
| 2,095,416 | Lefevre | Oct. 12, 1937 |
| 2,312,516 | Alldredge | Mar. 2, 1943 |
| 2,778,664 | Herbenar | Jan. 22, 1957 |
| 2,817,259 | Heuser | Dec. 24, 1957 |
| 2,852,287 | Baker | Sept. 16, 1958 |

FOREIGN PATENTS

| | | |
|---|---|---|
| 2,684 | Australia | Oct. 8, 1926 |
| 327,801 | Great Britain | Apr. 17, 1930 |

UNITED STATES PATENT OFFICE
CERTIFICATE OF CORRECTION

Patent No. 2,952,486            September 13, 1960

Franz Gottfried Reuter et al.

It is hereby certified that error appears in the printed specification of the above numbered patent requiring correction and that the said Letters Patent should read as corrected below.

Column 2, line 45, after " resistant," insert -- resistant --; line 72, for "polyester" read -- polyester --; column 6, line 52, for "chamber" read -- chambers --.

Signed and sealed this 11th day of April 1961.

(SEAL)
Attest:

ERNEST W. SWIDER
Attesting Officer

ARTHUR W. CROCKER
Acting Commissioner of Patents